Feb. 28, 1939.  J. W. HENDERSON  2,148,620
PHOTOGRAPHIC APPARATUS
Filed Jan. 25, 1937    2 Sheets-Sheet 1

INVENTOR
JAMES W. HENDERSON
BY C. C. Cousins
ATTORNEY

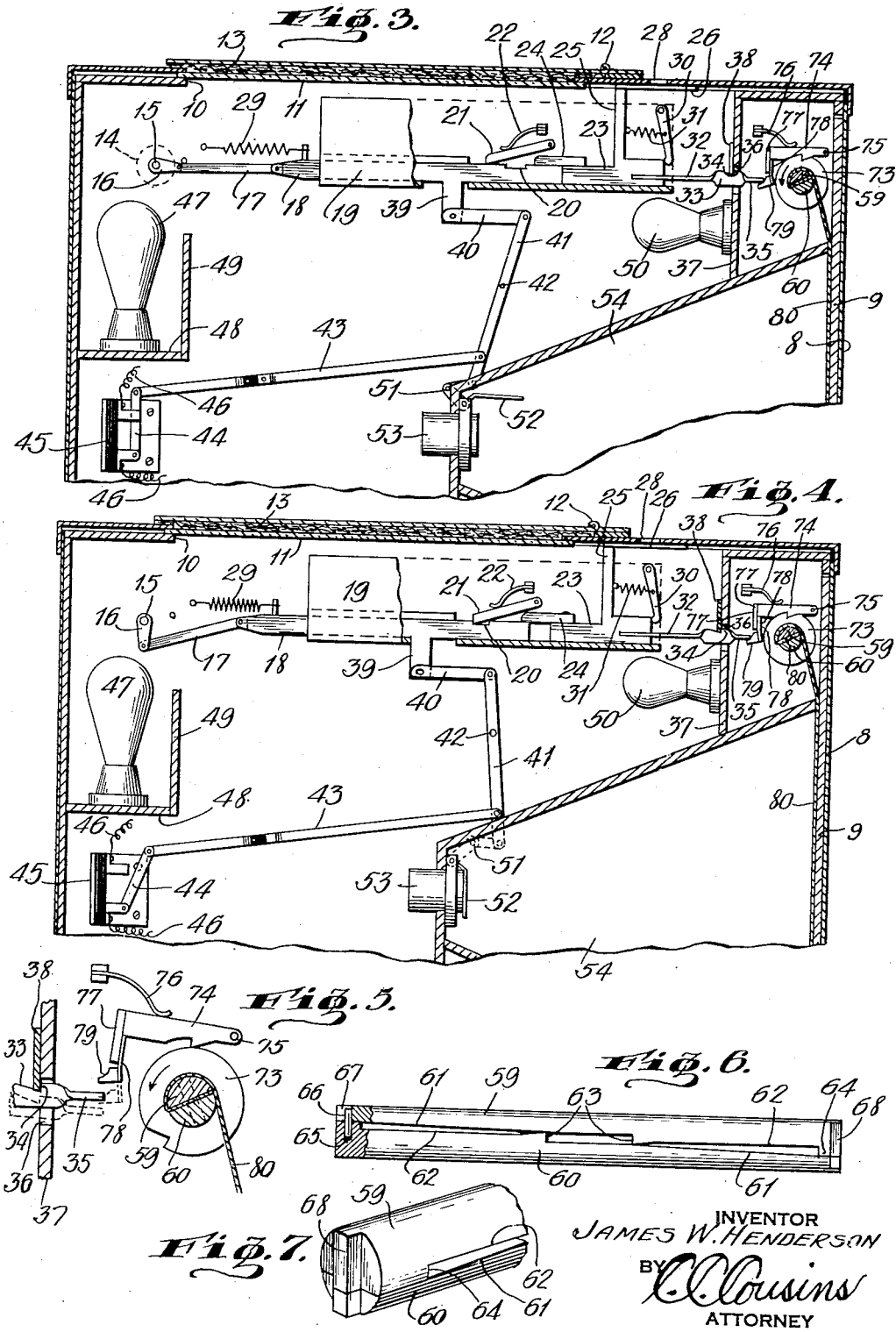

Patented Feb. 28, 1939

2,148,620

UNITED STATES PATENT OFFICE 2,148,620

PHOTOGRAPHIC APPARATUS

James W. Henderson, Park of Edgewater, N. Y., assignor to himself and Rudolph Hallensleben, Beechhurst, N. Y., jointly Application January 25, 1937, Serial No. 122,205

2 Claims. (Cl. 95—31)

This invention relates to a photographic apparatus.

One object of the invention is to provide an easily portable photographic apparatus, having re-inforced walls and having inside thereof a complete assembly of instrumentalities with which to photograph subject matter disposed under the upper wall of the casing of the apparatus.

A further object is to provide in such an apparatus a means for simultaneously closing a circuit, exposing a section of film by opening a shutter and locking a film roll so as to avoid a double exposure, all by the operation of a single actuating element.

A further object is to provide a locking means for a film roll which is actuated by the circuit closing actuating means, and which will remain locked until actuated by a film winding actuating means.

A further object is to provide an unlocking device actuated by the film winding element of the invention.

A further object is to provide a film roll of multiple parts which are easily separable by a slidable action and which will easily receive the reduced tip end of a film.

A further object is to provide a braking element on a roll of film to prevent slack or buckling of the film, or in other words, to maintain the film under a tension.

The invention consists of the construction, combination and arrangement of parts, as herein illustrated, described and claimed.

In the accompanying drawings, forming part hereof, is illustrated a form of embodiment of the invention, in which drawings similar reference characters designate corresponding parts, and in which:

Figure 3 is a vertical section, taken approximately on line 1—1 of Figure 2, looking in the direction indicated by the arrow, and showing the position of the parts when the apparatus has been actuated to open the shutter, close the switch and lock the film roll against rotation;

Figure 4 is a vertical section, taken approximately on line 1—1 of Figure 2, showing the position of the parts after an exposure has been made and the shutter closed and a part of the actuating mechanism locked so that another exposure cannot be made until the film locking means has been released in order to prevent a double exposure;

Figure 5 is a fragmentary detail in vertical section, taken through the walls of the casing and the film roll, and showing the film and locking device just after its actuating mechanism is released to be returned to a normal position;

Figure 6 is a side elevation partly in section of the film roll; and,

Figure 7 is a fragmentary detail in perspective of the end of the film roll which co-operates with its rotating mechanism.

Figure 1:
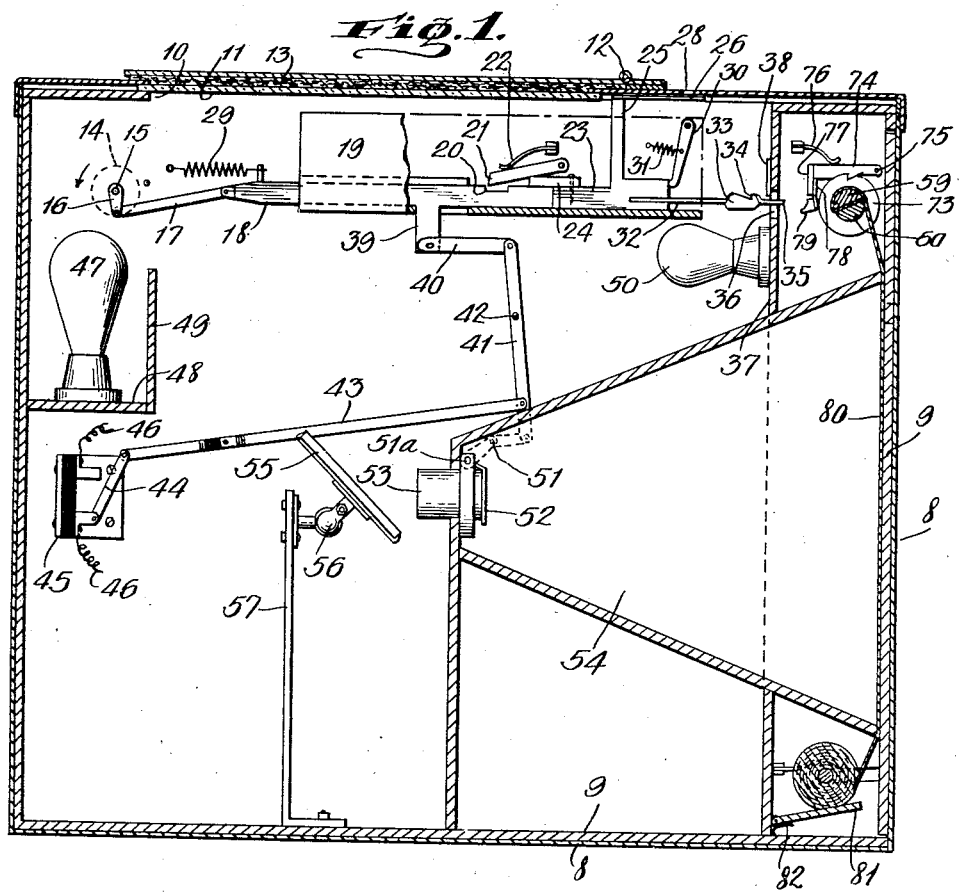
Figure 1 is a vertical section, taken approximately on line 1—1 of Figure 2 looking in the direction indicated by the arrow.

Referring to the drawings, 8 designates generally a light-proof casing, preferably of metal, having an inner wall of ply wood or similar light and shock-proof material. The casing 8 is made of a thin sheet metal construction for strength, and an inner wall 9 thereof is made of ply wood for the purpose of resisting shock and of re-inforcement, and to provide a means for attachment of securing devices for several of the moving parts, the entire construction being designed for strength and extreme lightness so that the construction is readily portable.

The casing described is provided with an opening 10 in its upper wall of a sufficient size to encompass a large sheet such as a page from a newspaper and is covered by a glass 11 or other transparent medium to form a surface upon which the page to be photographed may be disposed. A portion 12 of the outer casing 8 is hinged at 12 and attached thereto is a pad 13 of felt or similar material so that when the sheet to be photographed is placed on the glass 11 and the hinged section 12 of the top is lowered the sheet to be photographed is smoothly held in position and light is completely excluded from the outside.

An operating button 14 is disposed against one vertical wall of the casing 8 adjacent one of its ends and is mounted on the outer end of a rockable shaft 15 which projects through both walls of the casing and bears at its inner end an extension or arm 16. The free end of the extension 16 is pivoted to a link 17, the opposite end of which is pivoted to one end of an actuating member 18 which is slidably disposed in a guide 19 secured to the inner face of the ply wood wall 9 to provide a construction which may move the actuating member 18 longitudinally of the casing 8 by rocking the button 14.

In the upper face of the actuating member 18 is formed a notch 20 disposed in the path of movement of a pivoted pawl 21 which may be secured to the wall 9 or to the guide 19 which may be secured to the wall 9. The pawl 21 is normally maintained in a depressed position by a leaf-spring 22, the tension of which may be overcome when the parts are restored to normal position after the film has been wound and is ready for another exposure.

Disposed in the guide member 19 is a second slidable actuating member 23 the inner end of which abuts the outer end of the actuating member 18 when the apparatus is ready to be used for an exposure.

Disposed on the upper surface of the second slidable member 23 is a block or cam 24 so disposed as to ride underneath the pawl 21 when the second actuating member 23 is retracted and the tension of the spring 22 overcome to unlock the actuating member 18 and permit the retraction of the second member 23.

Extending upward from the second slidable member 23 intermediate of its ends is a vertical extension 25, carrying on its upper end a horizontal plate 26 on which are disposed indicia 27 to indicate the position of the parts as being exposed or set for an exposure. An opening 28 is in the top wall 9 of the casing 8 to permit the indicia being read by the operator. A spring 29 exerts a normal pressure to retract the actuating member 18 when the button 14 is operated.

To perform the same function on the second slidable member 23, a pawl 30 is pivoted in the path of movement of the second slidable member 23 and by means of a spring 32 the second slidable member 23 may be retracted, when unlocked as hereinafter described, and thus show the indicia 27 through the opening 28 to indicate that the apparatus is set or, as an alternative, contains an exposed section of film.

Carried on the forward end of the second slidable member 23 is a thin, flat resilient member 32, preferably formed from a thin strip of metal which has a twisted section 33 intermediate of its end formed with a shoulder or detent 34 and provided with a forward extension 35 lying in the plane of the main body of the member 32.

The extension 35 is formed on the forward end of the member 32 so as to project through an opening 36 in its path of movement, and formed in an inner wall 37 disposed adjacent one end of the casing 8 and extending from one of the side walls of the casing to the other and from the top wall to the bottom wall thereof. The wall 37 is adapted in part to support the lightproof box hereinafter described, and with the inner wall 9 at one end of the casing 8 to form a compartment for the reception of the film and its winding mechanism. On the inner face of the wall 37 and partly projecting over the opening 36 is disposed a flat plate or detent 38, the lower edge of which is adapted to engage behind the shoulder 34 of the member 32 when the parts are in the position shown in Figures 3 and 4, that is to say, when the film is locked against movement.

The first slidable actuating member 18 is provided with a downward extension 39, the lower end of which is pivoted to one end of a link 40, the other end of which link is pivoted to a lever 41 which in turn is pivoted at 42 intermediate of its length to permit a rocking movement when the actuating member 18 is moved backward or forward. It will be understood that the constructions described are very light and delicate and are supported from the inner ply wood wall 9 without having any parts projecting from the outer wall 8. It will thus be seen that the plywood wall 9 performs the dual function of reinforcing against shock and forms a support for the movable parts without having to use rivets or pins projecting beyond the outer surface of the casing.

Intermediate of its ends the lever 41 is pivoted to one end of a link 43, the opposite end of which is pivoted to the blade 44 of a switch 45 disposed in an electric circuit 46. Included in the electric circuit 46 is a plurality of lamps 47 disposed at the rear end of the casing 8. To support the lamps 47 a shelf 48 is secured to the inner wall of the casing, and partly masking the lamps 47 there is a vertical wall 49 secured to the shelf 48 so that the direct rays from the lamps 47 do not strike the shutter and reflector hereinafter described.

A second lamp 50 is included in the circuit 46 and is disposed on the wall 37. Connected with the lower end of the lever 41 is a double toggle 51 rockably supported on or operable by a rod 51a, carried by the inner wall 9 (shown best in Figure 2). The lower end of the toggle 51 is connected to a shutter 52 adapted to mask or close the inner end of a tube 53 disposed at the rear end of a dark box 54, the opposite end of which is open, and over the open end of which passes the film hereinafter described. The shutter 52 is suitably mounted for a rocking movement as best shown in Figures 3 and 4.

Figure 2:
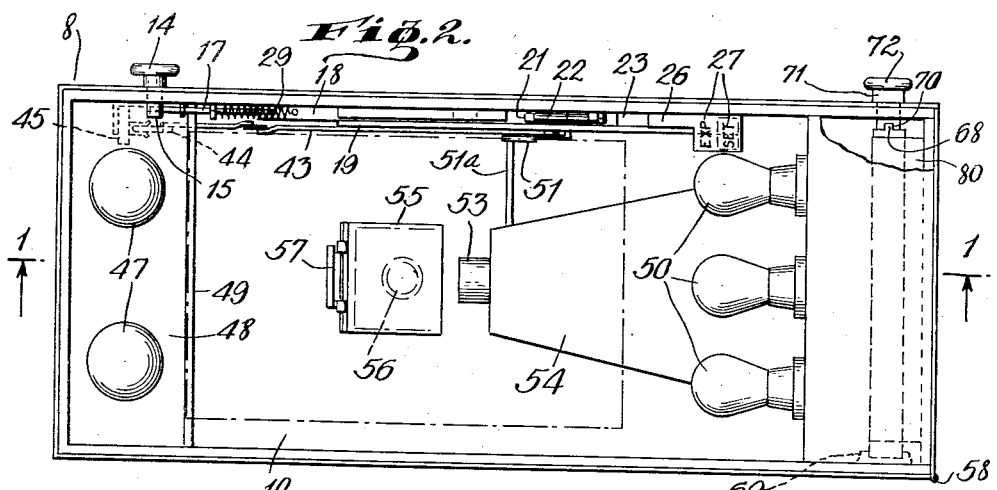
Figure 2 is a diagrammatic plan view, with the top or cover of the casing removed.

Disposed opposite the inner end of the tube 53 is an inclined reflector 55 which by means of a universal joint 56 is carried on a standard 57 secured to the bottom wall 9 of the casing, and is adapted to reflect the image of the object to be photographed through the tube 53, and when the shutter 52 is open onto the film hereinafter described. As best shown in Figure 2 the rear walls 8 and 9 of the casing are hinged as at 58 to permit access to the space between the wall 37 and the rear wall 9 and to permit the insertion and removal of the film.

The film rolls are designed to be easily and readily removed from the roll of film, and to this end comprise two semi-cylindrical sections 59 and 60. The inner faces of these sections 59 and 60 are each formed with an inclined section 61 extending from the opposite ends of the film roll and each is provided with a plane section 62 extending from the corresponding opposite ends of the semi-cylindrical sections 59 and 60, so as to leave shoulders 63 which maintain the semi-cylindrical sections 59 and 60 parallel with each other but which permits their separation by a relative sliding movement. The section 59 has an abutment 64 at one end to aid in accomplishing the same purpose.

In the sections 60, at one end thereof, is formed a slot 65 adapted to receive a pin 66, adapted to enter a recess 67 formed in the other section 59, so that the section 59 may be slid with relation to the section 60 when desired, but the function of the pin is to maintain the sections 59 and 60 together for the purpose of rotation, and winding of the film. When the film is entirely wound on the film roll described, the film roll can easily be removed by a sliding motion of one section 60 with relation to the other section.

One end of the film roll described is provided with a shoulder 68. One side wall 9 to the rear of the vertical wall 37 has secured thereto a bearing 69 adapted to receive the plane end of the film roll described and to support the same for rotation. The end of the film roll having the shoulder 68 is disposed in a slot 70 formed in the inner end of a shaft 71 mounted for rotation through the walls 8 and 9 adjacent one end of the casing and behind the vertical wall 37. Secured on the outer end of the shaft 71 is a button 72 by means of which the shaft 71 may be rotated and thus rotate the film roll.

Secured on the shaft 71 and inside of the casing is a notched washer 73 with which is arranged a co-operating pawl 74 which, when it is engaged with the washer 73, prevents the rotation of the shaft 71 and the consequent prevention of rotation of the film roll. The pawl 74 is pivoted at 75 to a portion of the wall 9 and is normally maintained in its downward position by a spring 76 also carried by the wall 9. The free end of the pawl 74 is provided with a downward extension 77 which in turn carries a light, flat spring 78 bearing on its free end a release block 79, the upper face of which is curved so that in its upward movement the block 79 will ride from under the face of the extension 35 of the member 32.

When the button 72 is rotated in the direction indicated by the arrow, the pawl 74 is released and carried upward against the tension of the spring 75, permitting the block 79 to ride from under the end 35 of the member 32 and without disengaging its shoulder 34 from the detent plate 38. After rotation of the notched washer 73 and the pawl 74 is again rocked downward by the spring 76, the block 79 by the action of the spring 78 is carried outwardly from the washer 73 so that when the pawl 74 is rocked downwardly again, the block 79 will strike the upper surface of the extension 35 and the resiliency of the member 32 is overcome, so that the notched shoulder 34 is disengaged from the detent plate 38 and the movable parts connected therewith resume their normal position.

The film 80 used may be of the ordinary type having a pointed end which may be inserted into the opening left between the film roll members 59 and 60, the abutting shoulders 63, forming a guide for the insertion of the film until it is rolled on the film roller. For the purpose of preventing looseness in the film by reason of the film not being properly wound, and for the purpose of preventing slack, a hinged brake member 81 is secured to the wall 37 adjacent its lower end, and under the tension of a spring 82 the brake member 81 is forced against the roll of film.

It will be understood that any suitable lenses may be inserted in the tube 53.

A cycle of operation of the apparatus may be described as follows:

The object to be photographed is placed on the glass cover 11 and the hinged cover 13 is closed down on the same. The parts being in the position shown in Figure 1 the button 14 is rotated in the direction indicated by the arrow and turned through an arc of 90 degrees, overcoming the tension of the spring 29 and actuating the slidable member 18, carrying with it the second slidable member 23 and forcing it to the position shown in Figure 4, where it is retained by reason of the detent plate 38 engaging behind the shoulder of the flexible metallic member 32.

The extension 35 at this time engages the curved surface of the block 79 and locks the pawl 74 with the notched washer 73 and prevents further rotation of the film or the danger of a double exposure.

When in the first step of operation as described the parts then assume the position shown in Figure 4, so that the pawl 21 engages in the notch 20 and the member 18 cannot be further actuated until the parts are released. The operation of the actuating member to the right-hand rocks the lever 41 and causes the closing of the switch 45 through the link 43, and at the same time through the toggle 51 opens the shutter 52. Thus it will be seen that simultaneously the film is locked, the shutter is opened, and the circuit is completed so that light is thrown against the page to be reproduced. The image of the page is reflected by the inclined reflecting surface 55 through the tube 53 and to the film 80.

When the button 14 is operated in reverse direction the slidable member 18 assumes its normal position, the shutter 52 is closed and the switch 45 is again opened.

In the meantime, the member 32 is held against retraction by reason of the detent plate 38 being still engaged behind the shoulder 34. When the button 72 is rotated the pawl 74 is carried upward against the tension of its spring 76 and the curved surface of the block 79 rides from under the extension 35 and the block 79 is carried in a direction away from the film roll and under the tension of its spring 76 is forced downward against the extension 35 unlocking the member 32 which is of flexible metal, so that the tension of the spring 31 rocks the pawl 30 and forces the second slidable member 23 towards the left-hand, so that the block 24 rides under the pawl 21 and releases it from the notch 20, so that the slidable member 18 may again be operated.

Having thus fully described the invention, what is claimed as new and desired to be secured by Letters Patent is:

1. In a photographic apparatus, a casing, film rolls mounted in the casing, one of which is provided with a recess, a spring pressed pawl disposed to engage in the recess, a resilient member on the pawl, a head on the resilient member, a plurality of slidable members, a retaining element having an opening therethrough and a resilient member carried by one of the slidable members having a shoulder thereon and arranged to project through the opening and to contact the head.

2. In combination with a film roll, a pawl disposed to engage with the roll, a resilient member carried by the pawl, terminating in an inclined surface, a resilient detent disposed in the path of movement of the inclined surface, and means for moving the detent into the path of movement of said surface and holding the same in position to be struck by movement of the pawl.

JAMES W. HENDERSON.